United States Patent
Fleeter

(10) Patent No.: US 6,409,124 B2
(45) Date of Patent: *Jun. 25, 2002

(54) HIGH-ENERGY TO LOW-ENERGY ORBIT TRANSFER VEHICLE

(76) Inventor: Richard D. Fleeter, 11573 Greenwich Point, Reston, VA (US) 20194

( * ) Notice: Subject to any disclaimer, the term of this patent is extended or adjusted under 35 U.S.C. 154(b) by 0 days.

This patent is subject to a terminal disclaimer.

(21) Appl. No.: 09/880,605

(22) Filed: Jun. 13, 2001

Related U.S. Application Data

(62) Division of application No. 09/350,813, filed on Jul. 9, 1999, now Pat. No. 6,286,787.

(51) Int. Cl.⁷ .................................................. B64G 1/22
(52) U.S. Cl. ............................... 244/158 R; 244/110 D
(58) Field of Search ........................ 244/160, 158 R, 244/113, 172, 169, 164, 173, 110 D

(56) References Cited

U.S. PATENT DOCUMENTS

| | | | | |
|---|---|---|---|---|
| 4,635,885 A | * | 1/1987 | Hujsak | |
| 4,667,907 A | * | 5/1987 | Hujsak et al. | |
| 4,754,601 A | * | 7/1988 | Minovitch | |
| 4,817,895 A | * | 4/1989 | Scott et al. | |
| 4,896,847 A | * | 1/1990 | Gertsch | |
| 4,903,918 A | * | 2/1990 | Park et al. | |
| 5,080,306 A | * | 1/1992 | Porter et al. | |
| 5,201,832 A | * | 4/1993 | Porter et al. | |
| 5,411,226 A | * | 5/1995 | Jones et al. | |
| 5,421,540 A | * | 6/1995 | Ting | |
| 6,286,787 B1 | * | 9/2001 | Fleeter | |

* cited by examiner

*Primary Examiner*—Charles T. Jordan
*Assistant Examiner*—T. Dinh
(74) *Attorney, Agent, or Firm*—Robert M. McDermott

(57) ABSTRACT

The excess space and weight capacity of a conventional launch vehicle for a high-energy orbit, such as GEO, is used to deploy satellites to a low-energy orbit, such as LEO. In a preferred embodiment, an orbit-transfer vehicle provides the navigation, propulsion, and control systems required to transport a payload satellite from a high-energy-transfer orbit, such as GTO, to a predetermined low-energy orbit. Upon entering the low-energy orbit, the payload satellite is released from the orbit-transfer vehicle. To reduce the fuel requirements for this deployment via the orbit-transfer vehicle, a preferred embodiment includes aerobraking to bring the satellite into a low-earth orbit. In a preferred embodiment of this method of deployment, the provider of the orbit-transfer vehicle identifies and secures available excess capacity on launch vehicles, and allocates the excess capacity to the satellites requiring low-earth orbit deployment, thereby providing a deployment means that is virtually transparent to the purchaser of this deployment service.

16 Claims, 4 Drawing Sheets

HIGH-ENERGY TO LOW-ENERGY ORBIT TRANSFER VEHICLE

CROSS-REFERENCE TO RELATED APPLICATIONS

This is a Division of U.S. patent application Ser. No. 09/350,813, filed Jul. 9, 1999, now U.S. Pat. No. 6,286,787.

BACKGROUND OF THE INVENTION

1. Field of the Invention

This invention relates to the field of aerospace, and generally to the deployment of small satellites in low-earth orbit (LEO).

2. Description of Related Art

Satellites, because of their unobstructed fields of view of large areas of the earth, are often the preferred technical solutions to a variety of communications and monitoring problems. The high cost of satellite deployment, however, often precludes their use from a cost-efficiency viewpoint. In order to distribute the high costs of deployment among a large number of applications or users, the majority of deployed satellites are those that handle a multitude of tasks, or a multitude of customers for the same task. To minimize the loss of available access time to or from the satellite from or to the location on earth being serviced by a satellite, many satellites are placed in geosynchronous orbit. A geosynchronous orbit tracks the revolution of the earth, so that the satellite appears to be fixed over the same area of the earth, thus providing continual access to that area. Due to the physics involved, a geosynchronous orbit is approximately 36,000 kilometers above the earth. To provide reliable communications over this long distance, a geosynchronous satellite requires highly sensitive receivers and/or highly powerful transmitters. Because of the aforementioned economic and technical requirements, geosynchronous satellites generally weigh a ton or more, and cost (in 1999) hundreds of millions of dollars to deploy to the selected geosynchronous orbit.

As contrast to large geosynchronous satellites, the use of small satellites at low-earth orbit (LEO) are becoming increasingly common. Copending U.S. patent applications "SATELLITE COMMUNICATION SYSTEM WITH A SWEEPING HIGH-GAIN ANTENNA", U.S. Ser. No. 09/045,971, filed Mar. 21, 1998 for Fleeter et al; "LOW-COST SATELLITE COMMUNICATION SYSTEM", U.S. Ser. No. 09/045,970, filed Mar. 21, 1998 for Fleeter et al; "IN SITU REMOTE SENSING", U.S. Ser. No. 09/130,854, filed Aug. 7, 1998 for Richard Fleeter; "RF INSPECTION SATELLITE", U.S. Ser. No. 09/267,942, filed Mar. 11, 1999 for Hanson et al, illustrate the use of low cost satellites for a variety of applications, and are incorporated by reference herein. Low-earth orbits are typically hundreds of miles above the earth, rather than thousands of miles. Because of their order of magnitude closer proximity to earth, satellites in low-earth orbit require significantly less communicating and monitoring power and sensitivity than the satellites in geosynchronous orbit. Because they are not stationary above any location on the earth, multiple satellites in low-earth orbit are required to provide continuous coverage of a particular area on earth. Because multiple satellites are required in low-earth orbit to provide continuous coverage, a low-earth orbit satellite system is particularly well suited to applications that employ low cost satellites. As advances continue to be made in electronic circuit density and efficiency, the number of communication and monitoring applications that can be embodied in small, low cost satellites continues to increase.

Deployment of a small, less than five hundred pound, satellite into low-earth orbit typically costs, in 1999 dollars, between seven and ten million dollars. Because a plurality of satellites is required to provide continuous coverage of an area, the overall cost of deploying constellations of low-earth orbit satellites can often amount to hundreds of millions of dollars.

BRIEF SUMMARY OF THE INVENTION

It is an object of this invention to provide a lower cost means for deploying a satellite into low-earth orbit. It is a further object of this invention to provide a method for economically brokering the deployment of a satellite into low-earth orbit. It is a further object of this invention to provide an orbit-transfer vehicle to effectively deploy small satellite systems to low-earth orbit.

A launch of geosynchronous satellites typically includes one or two large, multi-ton, satellites that are deployed at the geosynchronous altitude of 36,000 kilometers via a large multistage rocket system, such as an Ariane system. Typically, after allocating the available space and weight capabilities of the rocket system to the primary payload of the one or two large satellites, some excess space and weight allocation remains. For example, if an Ariane launch vehicle can accommodate four tons, and the primary payload satellites are 1½ and 2 tons each, the launch vehicle has an excess capacity of a half ton. Because the marginal cost of adding one or two small satellites is minimal, this excess space or weight capacity can be brokered for the deployment of small satellites at substantially less cost than the primary payload, often less than a quarter of the cost per pound charged to the primary payload satellites.

The expressed objects of this invention, and others, are achieved by providing a means of utilizing the excess space and weight capacity that is typical of a launch of large geosynchronous satellites to deploy small satellites at a low-earth orbit. Specifically, this invention provides a method of deployment of small satellite systems to low-earth orbit from a geosynchronous-transfer launch vehicle. In a preferred embodiment, an orbit-transfer vehicle provides the navigation, propulsion, and control systems required to transport a payload satellite from a geosynchronous-transfer orbit (GTO) to a predetermined low-earth orbit (LEO). Upon entering low-earth orbit, the payload satellite is deployed from the orbit-transfer vehicle. To reduce the fuel requirements for this deployment via the orbit-transfer vehicle, a preferred embodiment includes aerobraking to bring the satellite into a low-earth orbit. In a preferred embodiment of this method of deployment, the provider of the orbit-transfer vehicle identifies and secures available excess capacity on geosynchronous-transfer launch vehicles, and allocates the excess capacity to the satellites requiring low-earth orbit deployment, thereby providing a deployment means that is virtually transparent to the purchaser of this deployment service.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
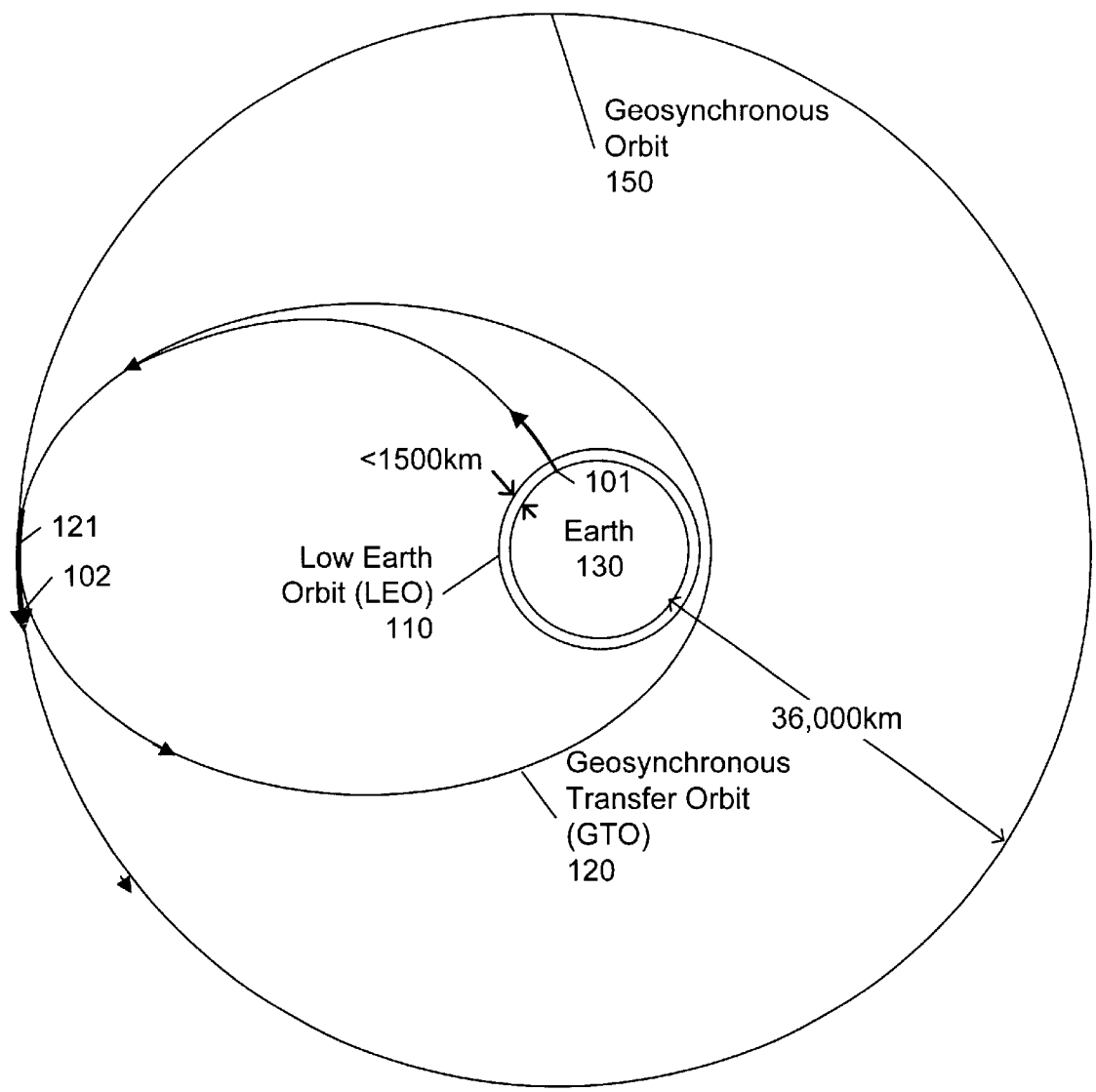
FIG. 1 illustrates a conventional deployment of a geosynchronous satellite via a geosynchronous-transfer launch vehicle.

FIG. 1 illustrates a conventional deployment of a geosynchronous satellite via a geosynchronous-transfer launch vehicle. Note that the figures are presented herein for illustration purposes. Although the relative size of the illustrated orbits are approximately to scale relative to the illustrated size of the earth 130, the specific details of the orbits should not be interpreted as being representative. A geosynchronous-transfer launch vehicle (not shown) containing one or more satellites for deployment in geosynchronous orbit 150 is launched 101 from the earth 130. The geosynchronous-transfer launch vehicle is configured to achieve a geosynchronous-transfer orbit 120 whose apogee 121 is tangent to the geosynchronous orbit 150. Some time after achieving the geosynchronous-transfer orbit 120, the one or more geosynchronous satellites (not shown) are released from the geosynchronous-transfer launch vehicle. All items that are released by the geosynchronous-transfer launch vehicle have the same velocity as the geosynchronous-transfer launch vehicle when they are released, and therefore continue to travel in the geosynchronous-transfer orbit 120. Each geosynchronous satellite contains a means for applying thrust 102, preferably at or near apogee 121, to enter an intended tangential geosynchronous orbit 150.

Figure 2:
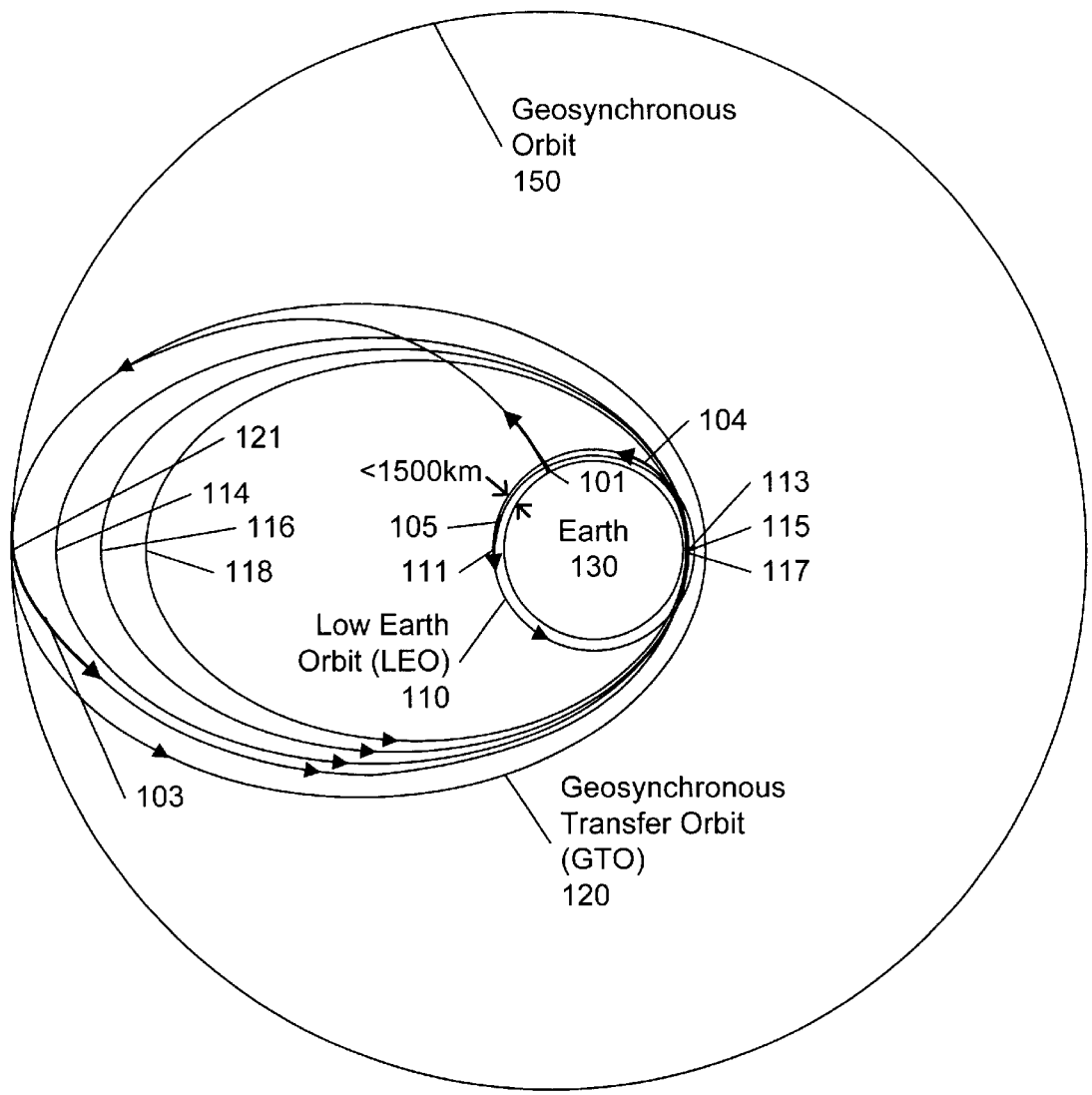
FIG. 2 illustrates an example deployment of a low-earth orbit (LEO) satellite using a geosynchronous-transfer launch vehicle in accordance with this invention.

FIG. 2 illustrates an example method of deploying a low-earth orbit (LEO) satellite using a geosynchronous-transfer launch vehicle in accordance with this invention. As noted above, a geosynchronous orbit 150 is located 36,000 kilometers above the earth 130. A low-earth orbit 110, on the other hand, is located well within 1500 kilometers of the earth 130. The Space Shuttle, for example, typically orbits the earth at an altitude between 160 and 600 kilometers. For ease of reference, the term geosynchronous-transfer launch vehicle is used to define a launch vehicle that deploys its payload at an elevation above the earth that is substantially higher than a low-earth orbit, because the most common use of a high-altitude launch vehicle is for geosynchronous satellite deployment.

In accordance with this invention, an orbit-transfer vehicle (not shown) containing the low-earth orbit satellite (not shown) is launched 101 from the earth 130 via a conventional geosynchronous-transfer launch vehicle (not shown), such as an Ariane. The geosynchronous-transfer launch vehicle releases the orbit-transfer vehicle into geosynchronous-transfer orbit 120. Some time after release, preferably at the apogee 121 of the geosynchronous-transfer orbit 120, the orbit-transfer vehicle fires 103 its integral propulsion device (not shown) to force itself, and the attached low-earth orbit satellite, out of the geosynchronous-transfer orbit 120, and begins a forced descent toward the earth 130. Another firing 104 of the propulsion device can thereafter be used to place the orbit-transfer vehicle directly into a low-earth orbit 110, but such a direct geosynchronous-transfer orbit to low-earth orbit transfer will require a substantial amount of fuel to reduce the kinetic energy of the orbit-transfer vehicle sufficiently to remain in the low-earth orbit 110.

In accordance with an aspect of this invention, aerobraking is used to facilitate the geosynchronous-transfer orbit to low-earth orbit transfer. Aerobraking uses the friction of the earth's atmosphere to reduce the kinetic energy of a spacecraft. Illustrated in FIG. 2, the firing 103 of the propulsion device provides a thrust to force the orbit-transfer vehicle close to the earth 130, at 113. In a preferred embodiment, the firing 103 of the propulsion device is controlled to provide a perigee 113 to within a hundred kilometers above the earth 130. At this nominal hundred kilometer altitude, the atmosphere of the earth is sufficiently dense so as to impart a frictional force that reduces the kinetic energy of the orbit-transfer vehicle, and its attached low-earth orbit satellite. This reduction in kinetic energy results in an apogee 114 of the orbit-transfer vehicle that is less than its original geosynchronous-transfer orbit apogee 121. Upon achieving apogee 114, the orbit-transfer vehicle is drawn toward the earth 130 again, and reaches perigee 115, also within 100 kilometers of the earth 130. The friction of the earth's atmosphere at this low altitude again reduces the kinetic energy of the orbit-transfer vehicle, and the resultant apogee 116 is less than the prior apogee 114. Subsequent traversals 117 of the earth's atmosphere will continue to reduce the kinetic energy of the orbit-transfer vehicle, further lowering each subsequent apogee 118.

When sufficient kinetic energy is removed from the orbit-transfer vehicle, the decreasing apogee 111 of the orbit-transfer vehicle substantially approaches the altitude of the intended low-earth orbit 110. At this apogee 111, the orbit-transfer vehicle effects the firing 105 of the integral propulsion device to force an ascent of the orbit-transfer vehicle so as to raise the perigee of the orbit-transfer vehicle, and attached low-earth orbit satellite, beyond the earth's atmosphere, thereby preventing further decreases of apogee. The preferred firing 105 places the orbit transfer vehicle, and attached low-earth orbit satellite, into a symmetric low-earth orbit 110, with a perigee that is substantially equal to the apogee 111. In a preferred embodiment, over one hundred aerobraking orbits are made before firing the integral propulsion device at 105. Typically, the orbit-transfer vehicle releases the low-earth orbit satellite at this low-earth orbit 110, and thereafter the low-earth orbit satellite operates independently, as it would have, had it been launched directly from the earth 130 to the low-earth orbit 110. That is, although the low-earth orbit satellite may travel hundreds of thousands of miles to reach an orbit 110 that is only a few hundred miles above the earth's surface, its operation is substantially independent of this rather circuitous deployment scheme.

Figure 3:
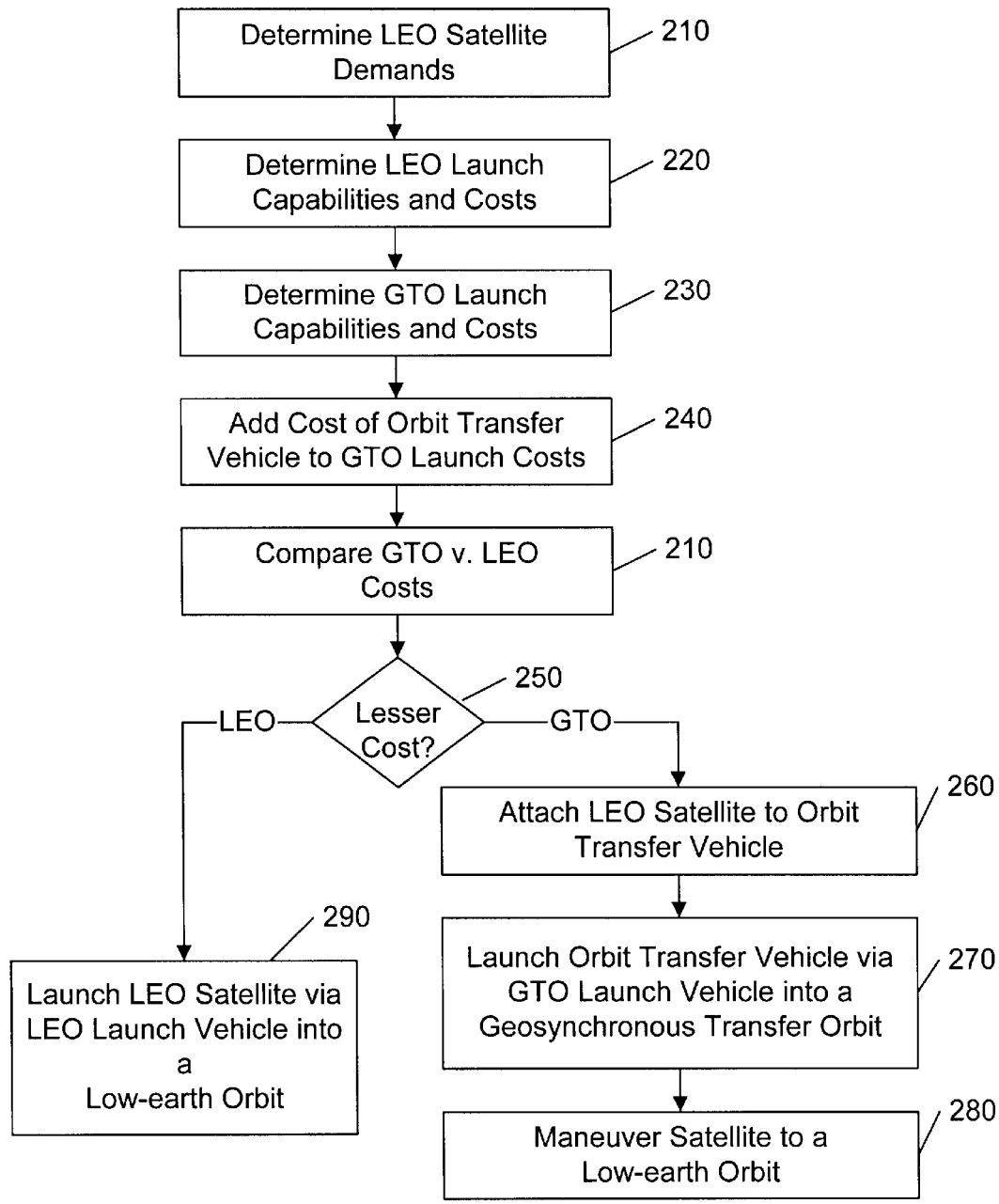
FIG. 3 illustrates an example method of facilitating the use of excess capacity of a geosynchronous-transfer launch vehicle for deploying a low-earth orbit satellite in accordance with this invention.

Because the deployment methods in accordance with this invention can be effected without affecting the satellite payload, this invention provides a means for brokering lower cost services for the deployment of low-earth orbit satellites. Generally, a satellite is used as a component of a ground-based system, such as a communications network, a research facility, and the like. The user, or owner, of the satellite is not necessarily fluent in the intricacies of rocketry and orbital mechanics. A satellite deployment broker provides the interface services and support between the owner of the satellite and the provider of a launch vehicle. In accordance with the principles of this invention, a satellite deployment broker can extend the range of potential low-earth orbit satellite launch vehicle providers to include geosynchronous-transfer launch vehicle providers having excess capacity. FIG. 3 illustrates, for example, a flow diagram for allocating launch services for low-earth orbit satellite deployments. At 210, the satellite(s) requirements are determined, including the required orbit parameters, the size and weight of the satellite, and so on. At 220, the cost of a conventional low-earth orbit launch that satisfies the requirements are determined or estimated. At 230, the availability of excess capacity on scheduled geosynchronous orbit launch vehicles is determined, and a cost is negotiated for using this excess capacity. The overall cost of deploying the low-earth orbit satellite via a geosynchronous-transfer launch is the cost of using the excess launch capacity of the geosynchronous-transfer launch vehicle plus the cost of the orbit-transfer vehicle for transporting the satellite from the geosynchronous orbit to the low-earth orbit, as determined at 240. If, at 250, the overall cost of the geosynchronous-transfer launch and orbit-transfer is less than the conventional low-earth orbit launch, the deployment is effected by attaching 260 the satellite to the orbit-transfer vehicle and launching 270 the orbit-transfer vehicle with satellite via the geosynchronous-transfer launch vehicle. Thereafter, the orbit-transfer vehicle effects the deployment 280 of the satellite to a low-earth orbit as discussed above. If, at 250, the cost of the conventional low-earth orbit launch is less expensive than the geosynchronous-transfer launch, the satellite is deployed 290 via the conventional low-earth orbit launch. Note that a deployment of a constellation of satellites to low-earth orbits in accordance with this invention can involve a combination of low-earth orbit and geosynchronous-transfer launches, depending primarily on the availability and cost of excess capacity on scheduled geosynchronous-transfer launch vehicles.

Figure 4:
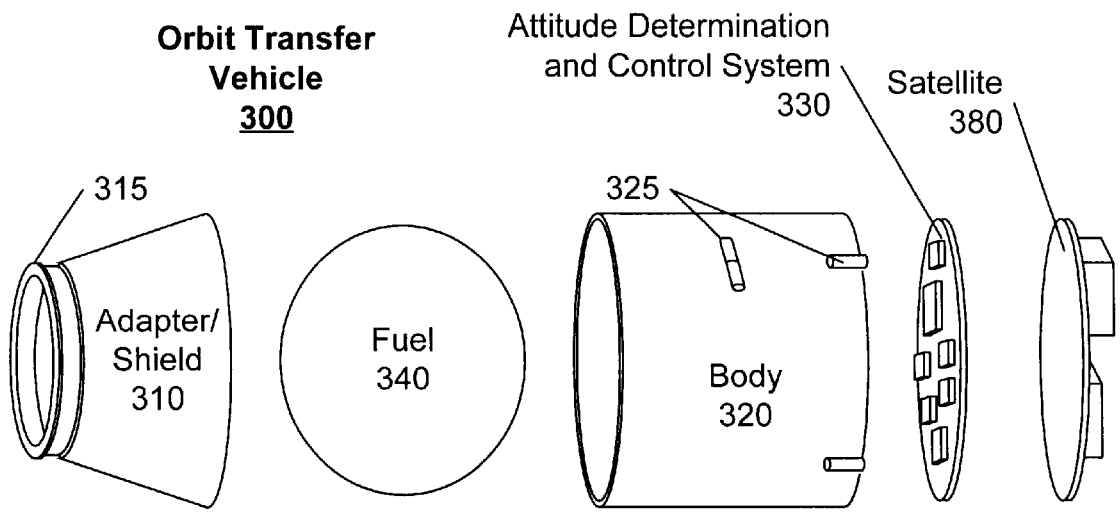
FIG. 4 illustrates an example orbit-transfer vehicle in accordance with this invention.
Figure 5:
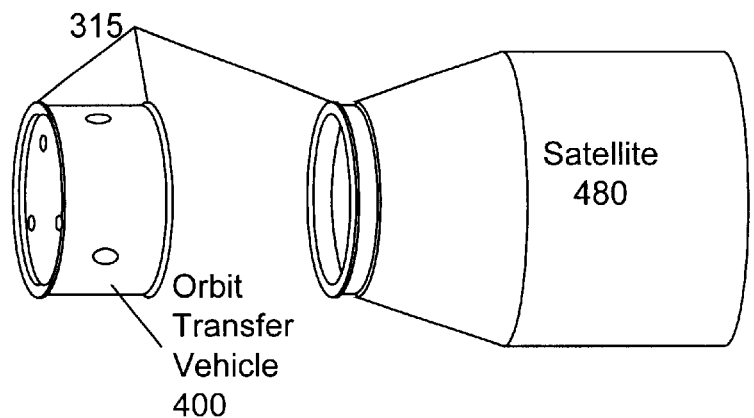
FIG. 5 illustrates an alternative example orbit-transfer vehicle in accordance with this invention.

FIG. 4 illustrates an example orbit-transfer vehicle 300 in accordance with this invention. The example orbit-transfer vehicle 300 includes an adapter element 310 that provides a conventional means 315 for securing the vehicle 300 to the geosynchronous-transfer launch vehicle (not shown), a body element 320 that provides a cavity for holding a fuel cell 340, and an attitude determination and control system 330 that provides the navigation, propulsion, and control systems required to transport the satellite from a geosynchronous-transfer orbit to a predetermined low-earth orbit. The adapter element 310 and body 320 in a preferred embodiment include shielding to enable the orbit-transfer vehicle 300 to withstand the heat that is induced by the atmospheric friction during aerobraking. The elevation at perigee 113, 115, 117 determines the required degree of shielding. Correspondingly, the elevation at perigee 113, 115, 117 determines the number of aerobraking orbits required to provide a sufficient reduction in the kinetic energy of the orbit-transfer vehicle 300 to achieve a low-earth orbit, given the capacity of the fuel cell 340. Jets 325 on the body element 320 effect the thrust required to effect the orbit-transfer, under the control of the attitude determination and control system 330. A satellite 380 is designed to be mounted within the body 320, and is released from the orbit-transfer vehicle 300 when the appropriate low-earth orbit is achieved. Alternative arrangements will be evident to one of ordinary skill in the art in view of this disclosure. For example, FIG. 5 illustrates an orbit-transfer vehicle 400 for use with a satellite 480 having an integral body 420 and conventional means 315 for securing the satellite 300 to a launch vehicle (not shown).

The foregoing merely illustrates the principles of the invention. It will thus be appreciated that those skilled in the art will be able to devise various arrangements which, although not explicitly described or shown herein, embody the principles of the invention and are thus within its spirit and scope. For example, the orbit-transfer components 430 can be built into the satellite 480, thereby eliminating the need to detach the components 430 upon achievement of the low-earth orbit.

I claim:

1. A method of deploying a payload satellite into a target orbit having an associated target-orbit energy-level, comprising:

placing the payload satellite on a launch vehicle, launching the launch vehicle, deploying the payload satellite from the launch vehicle with an associated kinetic energy, the kinetic energy associated with the payload satellite being substantially greater than the target-orbit energy-level associated with the target orbit, and maneuvering the payload satellite into the target orbit via a reduction in the kinetic energy associated with the payload satellite, to an energy level corresponding to the target-orbit energy-level.

2. The method of claim 1, wherein the reduction in kinetic energy includes:

aerobraking the payload satellite.

3. The method of claim 2, further including attaching the payload satellite to an orbit-transfer vehicle before the payload satellite is placed on the launch vehicle, and wherein the orbit-transfer vehicle effects the aerobraking of the payload satellite.

4. The method of claim 2, wherein the aerobraking includes applying thrust to the payload satellite so as to force the payload satellite to enter a portion of atmosphere above the earth when the payload satellite substantially reaches perigee.

5. The method of claim 4, wherein the aerobraking further includes applying thrust to the payload satellite so as to force the payload satellite to an orbit beyond the atmosphere above the earth when the payload satellite substantially reaches apogee at an elevation corresponding to the low-earth orbit.

6. The method of claim 1, further including attaching the payload satellite to an orbit-transfer vehicle before the payload satellite is placed on the launch vehicle, and wherein the step of maneuvering the payload satellite is effected by at least one of: the payload satellite, and the orbit-transfer vehicle.

7. The method of claim 6, further including detaching the payload satellite from the orbit-transfer vehicle.

8. A method of facilitating the deployment of a payload satellite into a target orbit having an associated target-orbit energy-level, comprising:

identifying an excess capacity on a scheduled launch vehicle having an associated transfer orbit that has an associated orbit-transfer energy level that is substantially higher than the target-orbit energy-level, facilitating an attachment of the payload satellite to the launch vehicle, facilitating a deployment of the payload satellite into the transfer orbit via the launch vehicle, the payload satellite thereby having a kinetic energy corresponding to the orbit-transfer energy level, and facilitating a maneuvering of the payload satellite to the target orbit via a substantial reduction in the kinetic energy of the payload satellite, from the orbit-transfer energy level to the target-orbit energy-level.

9. The method of claim 8, further including facilitating an aerobraking of the payload satellite so as to achieve the target orbit.

10. The method of claim 8, wherein the attachment of the payload satellite to the launch vehicle is via:
- an attachment of the payload satellite to an orbit-transfer vehicle, and
- an attachment of the orbit-transfer vehicle to the launch vehicle.

11. The method of claim 8, wherein the maneuvering of the payload satellite to the target orbit is via an orbit-transfer vehicle.

12. An orbit-transfer vehicle that facilitates the deployment of a payload satellite into a target orbit, comprising an attitude determination and control system that is configured to maneuver the orbit-transfer vehicle and the payload satellite from a launch orbit to the target orbit the launch orbit having an associated launch-orbit-energy that is substantially greater than a target-orbit-energy associated with the target orbit, wherein the orbit-transfer vehicle is configured to facilitate:
- an attachment of the payload satellite to the orbit-transfer vehicle, and
- an attachment of the orbit-transfer vehicle to a launch vehicle that is configured to deploy the orbit-transfer vehicle with attached payload satellite to the target orbit.

13. The orbit-transfer vehicle of claim 12, further including the payload satellite.

14. The orbit-transfer vehicle of claim 12, wherein the attitude determination and control system is configured to provide a thrust that is sufficient to force the orbit-transfer vehicle from the launch orbit into a portion of atmosphere to effect a decrease in kinetic energy of the orbit-transfer vehicle.

15. The orbit-transfer vehicle of claim 14, wherein the attitude determination and control system is further configured to apply thrust to the payload satellite so as to force the payload satellite beyond the atmosphere when the payload satellite substantially reaches apogee at an elevation corresponding to the target orbit.

16. The orbit-transfer vehicle of claim 12, wherein the orbit-transfer vehicle is configured to release the payload satellite when the orbit-transfer vehicle is maneuvered to the target orbit.

* * * * *

UNITED STATES PATENT AND TRADEMARK OFFICE
CERTIFICATE OF CORRECTION

| | |
|---|---|
| PATENT NO. | : 6,409,124 B2 |
| APPLICATION NO. | : 09/880605 |
| DATED | : June 25, 2002 |
| INVENTOR(S) | : Fleeter |

It is certified that error appears in the above-identified patent and that said Letters Patent is hereby corrected as shown below:

Column 8, line 6, please change --to the target-- to "to the launch".

Signed and Sealed this

Eleventh Day of July, 2006

JON W. DUDAS
*Director of the United States Patent and Trademark Office*